United States Patent [19]

White et al.

[11] 3,892,691

[45] July 1, 1975

[54] POLYURETHANE STRUCTURAL MEMBER

[75] Inventors: John R. White, Wadsworth; James M. Hogan, Tallmadge, both of Ohio

[73] Assignee: The Goodyear Tire & Rubber Company, Akron, Ohio

[22] Filed: July 10, 1974

[21] Appl. No.: 487,067

[52] U.S. Cl.... 260/2.5 AM; 260/2.5 AP; 260/2.5 BD; 296/31
[51] Int. Cl... C08g 22/48; C08g 22/06; C08g 22/14
[58] Field of Search. 260/2.5 AP, 77.5 AM, 8.5 AM

[56] References Cited
UNITED STATES PATENTS

| | | | |
|---|---|---|---|
| 2,866,774 | 12/1958 | Price | 260/2.5 AP |
| 2,929,800 | 3/1960 | Hill | 260/2.5 AP |
| 3,336,242 | 8/1967 | Hampson et al. | 260/2.5 AP |
| 3,509,077 | 4/1970 | Shultz | 260/2.5 AP |
| 3,591,532 | 7/1971 | Abercrombie et al. | 260/2.5 AP |
| 3,795,636 | 3/1974 | Huffman et al. | 260/2.5 AM |

OTHER PUBLICATIONS

Patten et al., Journal of Cellular Plastics, Vol. 8, No. 3, pages 134–143 (May/June 1972).

*Primary Examiner*—H. S. Cockerham
*Attorney, Agent, or Firm*—F. W. Brunner; J. D. Wolfe

[57] ABSTRACT

A structural member such as a facia composed of a one-shot polyurethane reaction product of a mixture of a quasi-prepolymer of methylene di-(phenylisocyanate) and dialkylene ether glycol, polypropylene ether triol, 1,4-butanediol and where desired, a blowing agent.

2 Claims, No Drawings

POLYURETHANE STRUCTURAL MEMBER

This invention relates to a process for making structural members, for example, a facia for automobiles, and to said member. More particularly, this invention relates to polyether urethanes structural members characterized by excellent impact at relatively high and low temperatures and essentially no heat sag at temperatures to which automobiles are exposed in use, usually up to 150°F. in the sun and 250°F. in bake oven. The term "facia" is used to mean either each one or a combination of each of the front end panels for the bumper ridge, grill, valence, head lamp bezels, fender extensions or the rear end construction filler panels, bumper ridge and valence, as well as sight shields and protective strips.

Heretofore the use of plastics and especially thermoplastic urethane in fabrication of structural members such as automobile parts has been proposed, probably the best recapitulation of these proposals and usage is found in the 1968 Mobay Chemical Company publication "THE ROLLING SHOWCASE FOR ENGINEERING PLASTICS" where many uses other than decorative wheels are pictured. Besides the thermoplastics, this article teaches to use integral-skin, high-density rigid urethane foams. Unfortunately, thermoplastics require extremely heavy duty molds to fabricate the parts. The part is thermoplastic in nature and exhibits some tendency to heat distort or sag at 150° to 250°F. and are very unsatisfactory at 300°F. as well as exhibits poor impact resistance at −20°F. The conventional liquid polyurethane reaction systems yield facia that likewise suffer from at least one of the following characteristics: inadequate strength, poor resilience, sag and impart deficiencies and tend to flap in the breeze at 70 miles per hour so the development and use of polyurethane structural members such as facia has been impeded, to say the least. As indicated above, the so-called cast polyurethanes were deficient in at least one respect, thus a change in compounding to improve the high temperature properties resulted in poor low temperature properties or some other deficiency.

An object of this invention is to provide a polyetherurethane structural member having sufficient impact to pass the minimum standards at −20°F., and resistance to sag at 250°F.

A polyetherurethane structural member can be made by injecting a special liquid polyetherurethane reaction mixture into preferably the lower part of a suitable prepared mold at very low pressures of 5 to 10 pounds per square inch, and higher if desired, and reacting to form a gelled or a set part having sufficient structural integrity to maintain its shape which can be removed from the mold within four minutes in the set condition having some free NCO, said reaction mixture being a very specific mixture formed just prior to injection by mixing the ingredients hereinafter enumerated and in the manner disclosed.

The liquid polyurethane reaction mixtures useful in this invention for producing structural members are made by the one-shot process utilizing a quasi-prepolymer instead of the conventional organic polyisocyanate. The quasi-prepolymer is made by reacting methylene di(phenyl isocyanate), sometimes referred to as MDI, with a polyether diol of less than 1000 molecular weight and preferably of 100 to 500 molecular weight in sufficient amount to give 18 to 26 and preferably 22 ± 10 weight percent of free NCO in the quasi-prepolymer.

The quasi-prepolymer, polyether polyol prepared by condensing propylene oxide on a triol selected from the class of trimethylol propane, trimethylol ethane or glycerol to give a polymer of approximately 4000 to 7000 molecular weight after being capped with at least 10 mole percent but no more than 25 mole percent of ethylene oxide, and a diol selected from the class of ethylene, propylene, butylene and preferably 1,4-butanediol for combination of good low and high temperature properties are mixed in a one-shot mixer such as an Admiral mixer or a high pressure impingement mixer such as a Krauss Maffei mixer. Usually for each mole of polyether triol, 11 to 13 moles of quasi-prepolymer having 18 to 26 weight percent of free NCO, and 10 to 12 and preferably 10.5 to 11.5 moles of diol are fed to the mixture to produce the liquid polyurethane reaction mixture.

The preferred polyether polyol useful in this invention is one having a hydroxyl functionality of 2.3 to 3.0 and preferably 2.3 to 2.8 since it is almost impossible to condense propylene oxide on a triol and ethylene oxide to cap the condensate without incurring some nonhydroxyl terminations or polymerization of propylene oxide and ethylene oxide on a nontriol nucleus.

The nature of this invention can be more readily appreciated by the following example where parts and percentages are by weight unless otherwise designated.

EXAMPLE I

An epoxy resin fiberglass impregnated mold was used for molding a structural member, hereinafter called a facia for the decorative front end of an automobile. A polyurethane reaction mixture was made by mixing 80 parts of an ethylene oxide (approximately 12%) capped propylene oxide adduct of trimethylol propane of about 6000 molecular weight with 20 parts of 1,4-butanediol, 0.05 parts of dibutyltin dilaurate, 0.05 parts of triethylene diamine, 1.25 parts of a carbon black pigment and a quasi-prepolymer of MDI and a dipropylene ether glycol having 22 percent free NCO at a reactive index of 103, based on the ratio of NCO to the total hydroxyls present. The ethylene oxide capped propylene oxide was condensed on a triol selected from the class of trimethylol propane and trimethylol ethane, 95 parts of a quasi-prepolymer, the reaction product of tripropylene ether glycol reacted with sufficient methylene-di(phenylene isocyanate) to give 21 to 23 percent free NCO.

Although the polyetherurethane facia can be made in a mold at ambient temperature, it is preferred that the mold be at 100° to 140°F. to give faster processing times, i.e. part forms in 15 seconds can be demolded in two minutes or less, preferably a three to six minute mold cycle. Also, it is preferred that mixing of the ingredients occurs at 85° to 120°F. to reduce the viscosity of the mix and allow the mold to be more readily filled.

These ingredients were mixed in an Admiral mixing apparatus and injected into the mold at 10 psi from the top (side) and allowed to react to yield a congealed part which was stripped from the mold and oven-cured for 30 minutes at 250°F.

The physical properties on this facia for the automobile front end had the following values:

| | |
|---|---|
| Specific gravity | 1.0 – 1.06 |
| Ultimate Tensile (psi) | 2500 – 3400 |
| Ultimate Elongation (%) | 250 – 230 |
| Tangent Modulus of Elasticity (psi): | |
| –20°F. | 83,000 ± 1,000 |
| 75°F. | 27,000 ± 6,000 |
| 158°F. | 5,000 ± 1,000 |
| Tear Strength (pli) | 440 – 600 |
| Sag at 250°F. (inches in 1 hr) | less than 0.3 |
| Resilience: | |
| Angle at 30 seconds | 12 |
| Angle at 5 minutes | 3 |
| Shore D hardness | 56 ± 3 |

This facia was free of the tendency to flap in the winds at 70 miles per hour that normally was experienced with conventional cast polyurethanes having good low temperature impact.

Facia of the above characteristics are obtained with one-shot mixing of 82 to 78 parts of polypropylene ether polyols having 2.3 to 3.0 hydroxyls and of 4500 to 6500 molecular weight, 86 to 104 parts of a quasi-prepolymer of MDI, 14 to 25 parts and preferably 18 to 22 parts of 1,4-butanediol and 0 to 10 parts of a blowing agent selected from the halocarbons, viz. trifluorochloroethane, boiling below 110°F. or water to give a density of 50 to 70 pounds per cubic foot.

The high temperature sag test is run on specimens 1 inch × 6 inches × 0.150±0.025 inch clamped in a cantilevered manner to have four inches projecting beyond the clamp support member and the inches of sag are measured after one hour in a hot air oven at 250°F. from the unsupported end. The resilience test is run on samples 4 inches × 12 inches × 0.150±0.025 inch which had been conditioned for 24 hours at 75°F. and 50 percent humidity. The test sample is clamped at one end on a supporting surface to expose 10.75 inches of the sample. A mandrel bar ¾ inches in diameter is positioned on the test sample 3¾ inches from the clamp. The sample is bent around the mandrel with the free end held against the clamped end for 30 seconds and then released. The angle the free end makes with the support surface is measured at 30 seconds and 5 minutes and reported as resilience angle.

While certain representative embodiments and details have been shown for the purpose of illustrating the invention it will be apparent to those skilled in this art that various changes and modifications may be made therein without departing from the spirit or scope of the invention.

What is claimed is:

1. A polyurethane structural member such as a facia prepared from a set liquid reaction mixture which goes from a liquid to a set state in less than four minutes in a mold heated about 100°–140°F. and exhibits free NCO groups at the time it is removed from the mold and has ultimate structural characteristics of a tear (pli) of 440 to 600, tangent modulus of elasticity at –20°F. of 83,000 ± 1,000, at 75°F. of 27,000 ± 6,000 and at 158°F. of 5,000 ± 1,000 and a sag at 250°F. for one hour of less than 0.3 inches and a Shore D hardness of 56 ± 3.

2. The structural member of claim 1 obtained by reacting a liquid reaction mixture comprising a mixture of 86 to 104 parts of a quasi-prepolymer of methane-di(phenyl isocyanate) and tripropylene ether glycol or dipropylene ether glycol having 18 to 26 weight percent free NCO, 82 to 78 parts of polypropylene ether triol, said triol being obtained by condensing propylene oxide on a triol generator selected from the generator consisting of trimethylol propane, trimethylol ethane and glycerol and capping with 10 to 25 mole percent of ethylene oxide to give a molecular weight of 4500 to 6500, 14 to 25 parts of 1,4-butanediol, and 0 to 10 parts of a blowing agent selected from the halohydrocarbons boiling below 110°F. or water to give a density of 50 to 70 pounds per cubic foot.

* * * * *